United States Patent
Yoon et al.

(10) Patent No.: US 11,590,966 B2
(45) Date of Patent: Feb. 28, 2023

(54) SYSTEM AND METHOD FOR SUPPORTING AUTOMATED VALET PARKING, AND INFRASTRUCTURE AND VEHICLE THEREFOR

(71) Applicants: Hyundai Motor Company, Seoul (KR); Kia Motors Corporation, Seoul (KR); Industry Academy Cooperation Foundation of Sejong University, Seoul (KR)

(72) Inventors: Sung Won Yoon, Gyeonggi-do (KR); Jae Kyu Suhr, Incheon (KR); Mi Jin Choi, Gyeonggi-do (KR); Ho Gi Jung, Seoul (KR)

(73) Assignees: Hyundai Motor Company, Seoul (KR); Kia Motors Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 17/136,227

(22) Filed: Dec. 29, 2020

(65) Prior Publication Data

US 2021/0197802 A1    Jul. 1, 2021

(30) Foreign Application Priority Data

Dec. 31, 2019   (KR) .................. 10-2019-0179916

(51) Int. Cl.
*B60W 30/06*   (2006.01)
*H04W 4/44*    (2018.01)
(Continued)

(52) U.S. Cl.
CPC ............ *B60W 30/06* (2013.01); *B60W 40/09* (2013.01); *G06K 9/6276* (2013.01); *G06V 20/58* (2022.01);
(Continued)

(58) Field of Classification Search
CPC combination set(s) only.
See application file for complete search history.

(56) References Cited

U.S. PATENT DOCUMENTS

| | | | |
|---|---|---|---|
| 2010/0156672 A1 | 6/2010 | Yoo et al. | |
| 2012/0188100 A1* | 7/2012 | Min | E04H 6/426 340/932.2 |

(Continued)

OTHER PUBLICATIONS

Extended European Search Report for EP Application No. 20217828.1, dated Jun. 4, 2021, 11 pages.
(Continued)

*Primary Examiner* — Thomas S McCormack
(74) *Attorney, Agent, or Firm* — Fox Rothschild LLP

(57) ABSTRACT

A system and a method for supporting automated valet parking, and an infrastructure and a vehicle therefor are provided. The method for operating a vehicle which supports automated valet parking includes initializing automated valet parking and receiving, from an infrastructure, a target position which is related to the vehicle and a guide route which guides movement to the target position. Additionally, the method includes performing automated driving by the vehicle along the guide route, and measuring a position of the vehicle based on behavior information of the vehicle and environmental information, while the vehicle performs the automated driving. The environmental information includes at least one among parking lot slot information, road signs, walls, pillars, and floor markings.

16 Claims, 13 Drawing Sheets

(51) Int. Cl.
*B60W 40/09* (2012.01)
*G06K 9/62* (2022.01)
*G08G 1/01* (2006.01)
*G06V 20/58* (2022.01)

(52) U.S. Cl.
CPC ......... *G06V 20/586* (2022.01); *G08G 1/0116* (2013.01); *H04W 4/44* (2018.02); *B60W 2420/52* (2013.01)

(56) References Cited

U.S. PATENT DOCUMENTS

| | | |
|---|---|---|
| 2015/0142248 A1 | 5/2015 | Han et al. |
| 2016/0318523 A1* | 11/2016 | Kim .......................... B60R 1/00 |
| 2017/0297625 A1 | 10/2017 | Irion et al. |
| 2017/0313306 A1 | 11/2017 | Nordbruch |
| 2019/0291721 A1* | 9/2019 | Sakano .................... G08G 1/16 |
| 2019/0339393 A1* | 11/2019 | Lingg ................ G06K 9/00805 |

OTHER PUBLICATIONS

European Office Action dated Nov. 4, 2022 in corresponding European Application No. 20 217 828.1.

* cited by examiner

FIG. 4A

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver these information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD), and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and stop the vehicle at the target position designated by infra (equivalent to PAPS parking requirements) |

FIG. 4B

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>(1) vehicle received an instruction from infra for E/S<br>(2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

FIG. 5

| DATA | Contents | Transmit (T)/ Receive (R) | | Regularly(P)/ Event(E) Transmission | Note |
|---|---|---|---|---|---|
| | | Infrastructure | Vehicle | | |
| (1) Vehicle qualification information | ID number (VIN) to identify each vehicle | R | T | When entering the parking | |
| (2) Automated driving preparation instruction | — | T | R | Right before automated driving start | |
| (3) Vehicle information notification | Vehicle state (normal stop, driving/emergency stop, etc.)(vehicle position)(speed) | R | T | F (1 Hz) | This is also used for communication fault check by the vehicle |
| (4) Vehicle information response | — | T | R | F (1 Hz) | |
| (5) Target position - guide route Delivery | Target position - Passing point location/permitted time to pass through the point (Maximum speed) | T | R | After automated driving instruction | |
| (6) Driving boundaries delivery | A group of lines to surround the permitted driving area | T | R | after automated driving preparation instruction | |
| (7) Automated driving start instruction | — | T | R | After delivery of guide route and driving boundaries, when requesting after emergency stop | |
| (8) Emergency stop instruction | — | T | R | E | |
| (9) Vehicle control release instruction | — | T | R | E | |

SYSTEM AND METHOD FOR SUPPORTING AUTOMATED VALET PARKING, AND INFRASTRUCTURE AND VEHICLE THEREFOR

CROSS-REFERENCE(S) TO RELATED APPLICATIONS

This application claims priority to Korean Patent Application No(s). 10-2019-0179916, filed on Dec. 31, 2019 the disclosure(s) of which is(are) incorporated herein by reference in its (their) entirety.

BACKGROUND

Field of the Disclosure

The present disclosure relates to a system and a method for supporting automated valet parking, and an infrastructure and a vehicle therefor, and according to the present disclosure, a vehicle moves to an empty parking space without a driver intervention and executes parking using communication between the infrastructure and the vehicle.

Description of the Related Art

There are many potential risks with parking a vehicle today. First, there is a high possibility of an accident in the parking lot. Further, if a driver wants to park in a facility such as a large parking lot, the driver spends a lot of time and energy trying to find parking. The driver who has completed parking needs to inconveniently move to the parked vehicle and in some cases, the driver forgets where the vehicle is parked.

SUMMARY

An object of the automated valet parking according to the present disclosure is that a vehicle moves to an empty parking space in an autonomous mode to complete parking when a driver stops the vehicle in a drop off area and exits the vehicle. Further, another object of the automated valet parking according to the present disclosure is that when the driver calls the vehicle, the parked vehicle moves to a pick-up area in an autonomous mode, and the driver enters the vehicle in the pick-up area to exit from a facility. Further, still another object of the automated valet parking according to the present disclosure is to measure the position of a vehicle based on environmental information including at least one of parking lot slot information, road signs, walls, columns, and floor markings.

The technical objects to be achieved in the present disclosure are not limited to the aforementioned technical objects, and other technical objects which are not mentioned may be clearly understood by those skilled in the art to which the present disclosure pertains, from the description below.

A method for operating a vehicle which supports automated valet parking according to exemplary embodiments of the present disclosure may include initializing automated valet parking, receiving, from an infrastructure, a target position which is related to the vehicle and a guide route which guides movement of the vehicle to the target position, performing automated driving by the vehicle along the guide route, and measuring a position of the vehicle based on behavior information of the vehicle and environmental information, while the vehicle performs the automated driving, and the environmental information may include at least one among parking lot slot information, road signs, walls, pillars, and floor markings.

A method for performing automated valet parking according to exemplary embodiments of the present disclosure may include initializing automated valet parking of a vehicle, transmitting a target position and a guide route from an infrastructure to the vehicle, performing automated parking by the vehicle along the guide route, and providing measured position of the vehicle to the infrastructure by measuring a position of the vehicle based on behavior information of the vehicle and environmental information, while the vehicle performs automated driving, and the environmental information may include at least one among parking lot slot information, road signs, walls, pillars, and floor markings.

The system for supporting the automated valet parking according to exemplary embodiments of the present disclosure may be configured to measure the position of the vehicle based on the environmental information including at least one of the parking lot slot information, the road signs, the walls, the columns, and the floor markings, thereby more accurately measuring the position of the vehicle even in the indoor parking lot.

The effects which may be obtained through the present disclosure are not limited to the aforementioned effects, and other effects not mentioned may be clearly understood by those skilled in the art to which the present disclosure pertains, from the description below.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present invention, and wherein:

FIGS. 4A and 4B are block diagrams for explaining operations performed by an infrastructure and a vehicle, which perform an automated valet parking according to an exemplary embodiment of the present disclosure.

FIG. 5 is a diagram for explaining communication between the infrastructure and the vehicle, which perform the automated valet parking according to an exemplary embodiment of the present disclosure.

DETAILED DESCRIPTION

Figure 1:
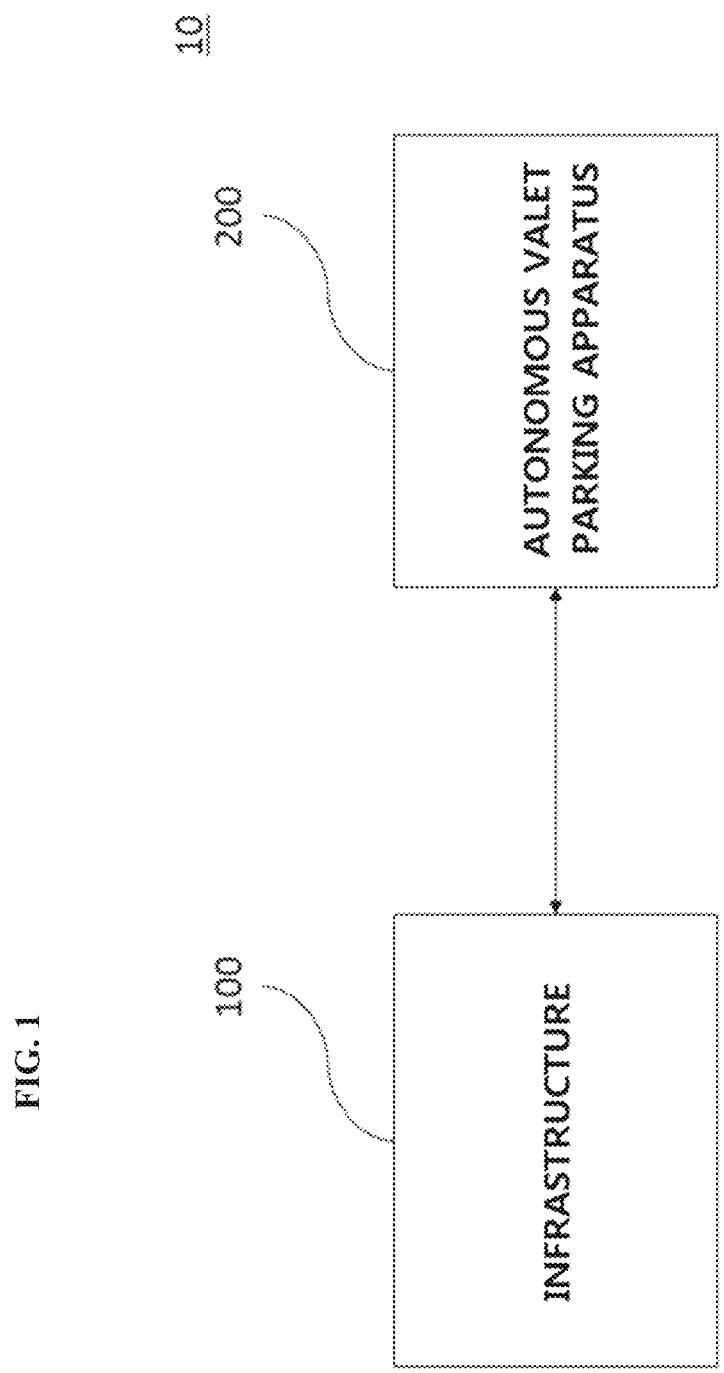
FIG. 1 is a diagram illustrating an automated valet parking system according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments according to the present disclosure will be described in detail with reference to the accompanying drawings. The configuration and operation effects of the present disclosure will be clearly understood through the following detailed description. Prior to the detailed description of the present disclosure, it is noted that the same components are denoted by the same reference numerals as possible even though they are illustrated on different drawings, and when it is determined that the publicly-known components may obscure the subject matter of the present disclosure, detailed descriptions thereof will be omitted.

Prior to the detailed description of the present disclosure, terms used in the present disclosure may be defined as follows. A driver is a human using a vehicle and receiving a service of an automated valet parking system. Driving authority is the authority for executing an operation of the vehicle. The operation of the vehicle includes, for example, a steering operation, an acceleration operation, a braking operation, a gear shift operation, an operation to turn on/off the start-up of the vehicle, and an operation to lock/unlock the door of the vehicle. The vehicle is a vehicle having a function of performing an automated valet parking.

A control center is a facility which performs monitoring of vehicles within the parking facility, and may determine a target position, a guide route, and a permitted driving area, and operate the vehicle to transmit a driving start command or an emergency stop command. The infrastructure may be a parking facility, and may be sensors disposed within the parking facility. Further, the infrastructure may refer to a parking gate and a control center which operates the vehicle.

A target position may refer to an empty parking space in which the vehicle will be parked. Further, the target position may refer to an area where the driver will enter the vehicle, that is, a pick-up area, in a situation where the vehicle leaves a parking lot. A guide route may refer to a route through which the vehicle passes to reach the target position. For example, the guide route is a route from a drop-off area to an empty space in a situation where parking is executed. For example, the guide route may be in the form of moving forward by about 50 m or turning left at the corner.

A driving route may refer to a route that the vehicle follows. A permitted driving area may refer to an area where driving is permitted, such as a driving route within a parking lot. The permitted driving area may be defined by slot walls, parked vehicles, and parking lines.

FIG. 1 illustrates an automated valet parking system according to an exemplary embodiment of the present disclosure. Referring to FIG. 1, an automated valet parking system 10 may include an infrastructure 100 and an automated valet parking apparatus 200.

As described above, the infrastructure 100 may refer to an apparatus or a system for operating, managing, and performing the automated valet parking system. For example, the infrastructure 100 may be a parking facility. According to exemplary embodiments, the infrastructure 100 may include sensors, a communication device, an alarm device, a display device, and a server configured to operate the aforementioned devices. Further, the infrastructure may refer to a parking gate and a control center configured to operate the vehicle.

Figure 2:
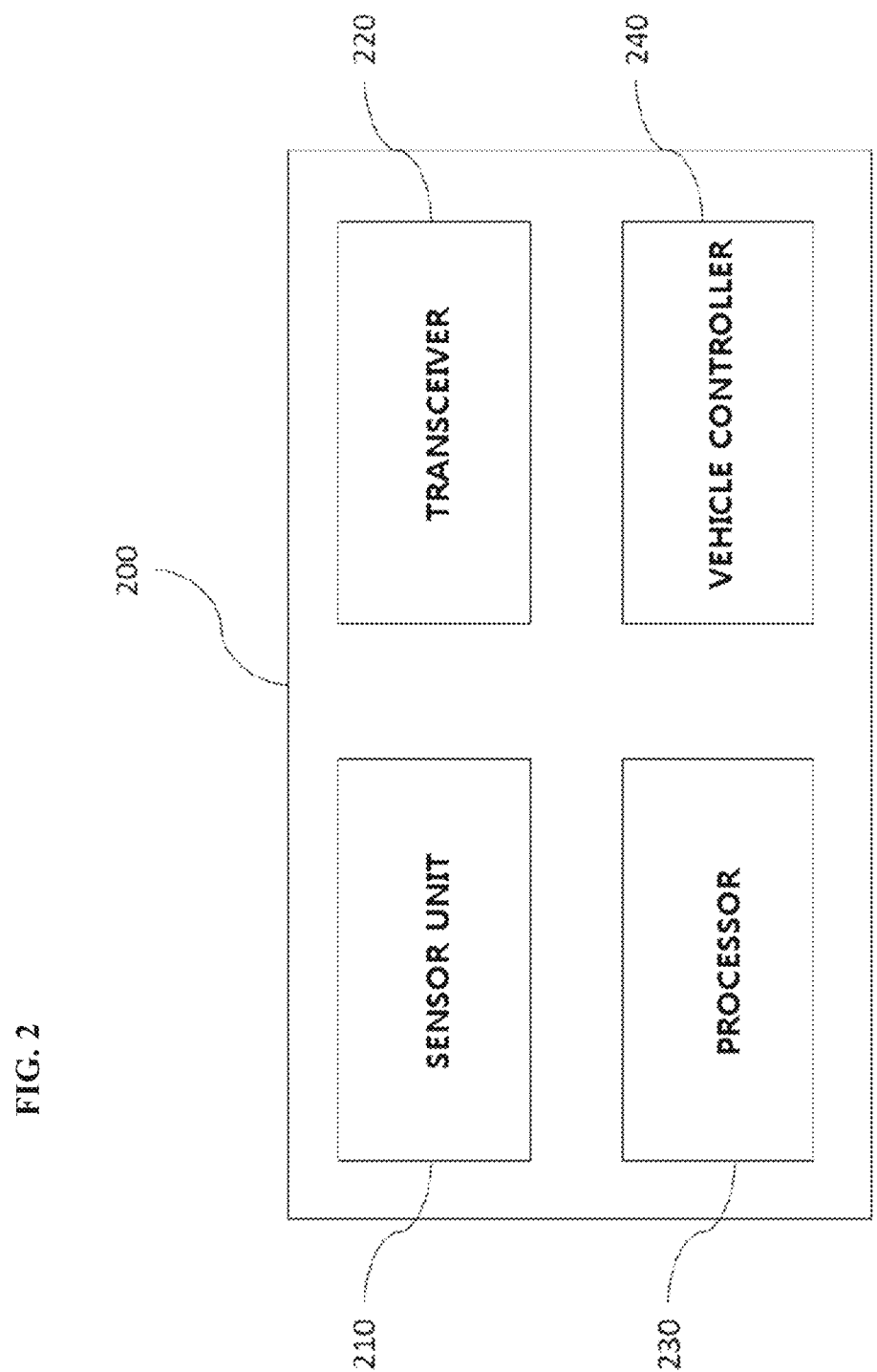
FIG. 2 is a diagram illustrating an automated valet parking apparatus according to exemplary embodiments of the present disclosure.

The automated valet parking apparatus 200 may refer to a vehicle which performs an automated valet parking. According to exemplary embodiments, the automated valet parking apparatus 200 may refer to a component or a set of components included in a vehicle capable of performing the automated valet parking. FIG. 2 illustrates an automated valet parking apparatus according to an exemplary embodiment of the present disclosure. Referring to FIG. 2, the automated valet parking apparatus (e.g., a vehicle) 200 may include a sensor 210, a transceiver 220, a processor 230, and a vehicle controller 240.

The sensor 210 may be configured to sense environments around the automated valet parking apparatus 200. According to exemplary embodiments, the sensor 210 may be configured to measure a distance between the automated valet parking apparatus 200 and a specific object, or may sense an object around the automated valet parking apparatus 200. For example, the sensor 210 may include at least one among an ultrasonic sensor, a radar sensor, a lidar sensor, a camera, an infrared sensor, a thermal sensor, and a millimeter wave sensor. The sensor 210 may be configured to transmit data, generated according to the sensed result, to the transceiver 220 or the vehicle controller 240.

The transceiver 220 may be configured to exchange data with the infrastructure 100. Such communication is referred to as vehicle-to-infrastructure communication (V2I). Further, the transceiver 220 may be configured to exchange data with other vehicles. Such communication is referred to as vehicle-to-vehicle communication (V2V). The integration of the V2I communication and the V2V communication is referred to as Vehicle to everything communication (V2X). According to exemplary embodiments, the transceiver 220 may be configured to receive data (e.g., a target position, a guide route, a driving route, a command, or the like) transmitted from the infrastructure 100, and process the received data to transfer the processed data to the processor 230. Further, the transceiver 220 may be configured to transmit data, generated from the automated valet parking apparatus 200, to the infrastructure 100. According to exemplary embodiments, the transceiver 220 may be configured to exchange data with a driver's terminal of the automated valet parking apparatus 200.

The transceiver 220 may be configured to transmit or receive data using a wireless communication protocol or a wired communication protocol. For example, the wireless communication protocol may include wireless LAN (WLAN), Digital Living Network Alliance (DLNA), Wireless Broadband (Wibro), World Interoperability for Microwave Access (Wimax), Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, Wi-Fi Direct, and the like. Further, the wired communication protocol may include wired Local Area Network (LAN), wired Wide Area Network (WAN), Power Line Communication (PLC), USB communication, Ethernet, serial communication, and optical/coaxial cable, and the like, but is not limited thereto but may include all of protocols which may provide communication environments with other devices.

The processor 230 may be configured to execute the overall operation of the automated valet parking apparatus 200. The processor 230 may be configured to operate the vehicle controller 240 based on data transmitted through the sensor 210 and the transceiver 220. According to exemplary embodiments, the processor 230 may be configured to generate a control signal for operating the vehicle controller 240 according to data transmitted from the infrastructure 100, and transmit the generated control signal to the vehicle controller 240.

In other words, the processor 230 may refer to a device capable of operating the automated valet parking apparatus 200, and performing a series of operations or determinations for performing automated valet parking. For example, the processor 230 may be a processor in which a program including commands for performing the automated valet parking is executed. The processor 230 may include a central processing unit (CPU), a micro processor unit (MCU), an application specific integrated circuit (ASIC), a field programmable gate array (FPGA), a graphics processing unit (GPU) or the like, but is not limited thereto.

The vehicle controller 240 may be configured to operate the automated valet parking apparatus 200 under the control of the processor 230. According to exemplary embodiments, the vehicle controller 240 may be configured to operate the automated valet parking apparatus 200 in response to a control signal transmitted from the processor 230. For example, the vehicle controller 240 may be configured to adjust movement, stop, movement restart, steering, acceleration, deceleration, parking, flashing, alarm, and the like of the automated valet parking apparatus 200.

In other words, it should be understood that the vehicle controller 240 may be configured to perform all functions for controlling the operation of the automated valet parking apparatus 200 described in the present specification. For example, the vehicle controller 240 may include a driving device, a braking device, a steering device, an acceleration device, an alarm device, and a flashing device of the automated valet parking apparatus 200.

Meanwhile, unless otherwise described, it should be understood that the operation or function of the automated valet parking apparatus 200 described in the present specification is appropriately performed by at least one combination among the sensor 210, the transceiver 220, the processor 230, and the vehicle controller 240.

Figure 3:
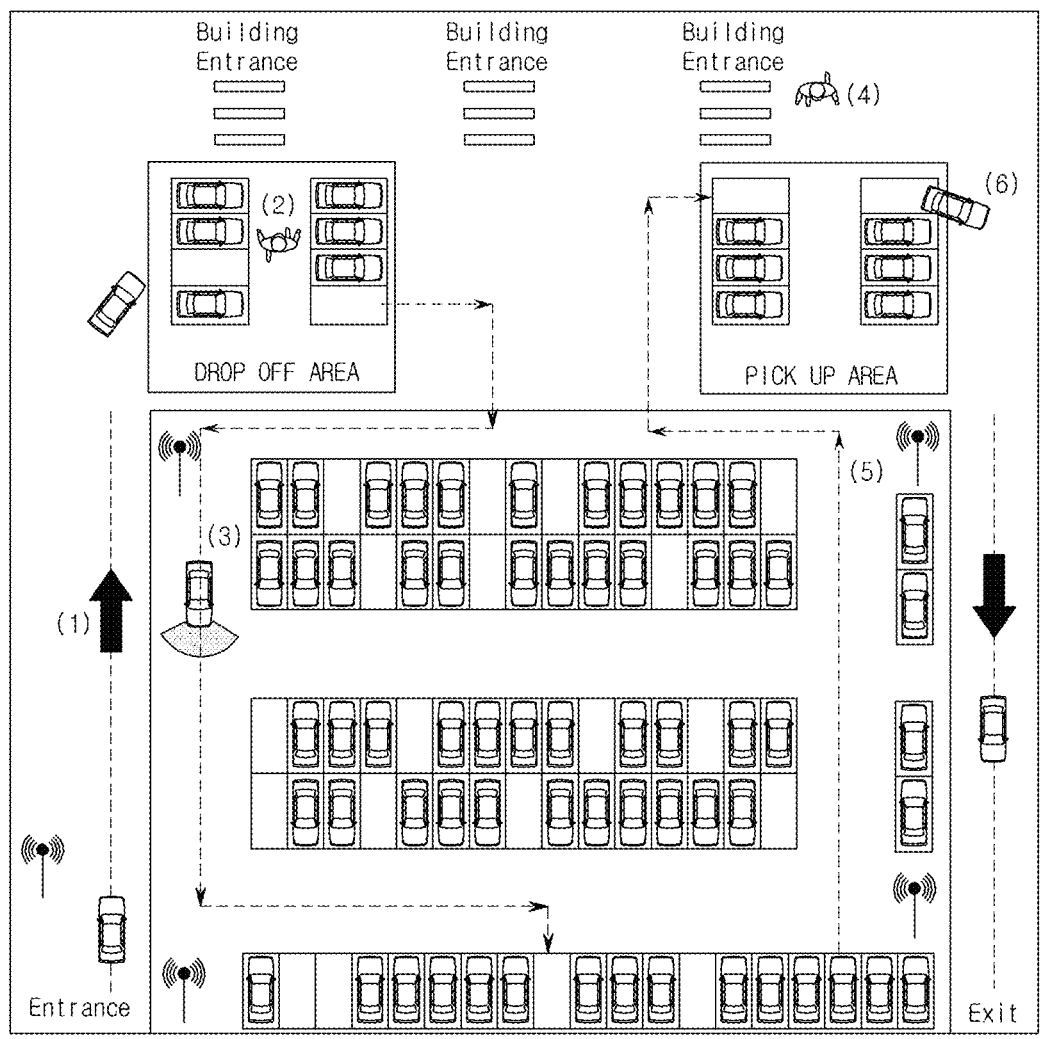
FIG. 3 is a conceptual diagram for explaining an automated valet parking system and method according to an exemplary embodiment of the present disclosure.

FIG. 3 is a conceptual diagram for explaining an automated valet parking system and method according to an exemplary embodiment of the present disclosure. Referring to FIG. 3, in (1), a driver drives a vehicle (e.g., the automated valet parking apparatus 200 illustrated in FIG. 1) to enter a parking lot and moves the vehicle to a drop-off area. In (2), the driver who has reached the drop-off area exits the vehicle and the driving authority is transferred from the driver to the infrastructure (e.g., the infrastructure 100 illustrated in FIG. 1).

In (3), the infrastructure searches for an empty parking space among a plurality of parking spaces which exist within the parking lot, and determines an empty parking space in which the corresponding vehicle is to be parked. Further, the infrastructure determines a guide route to the determined empty parking space. When the parking space and the guide route are determined, the vehicle autonomously travels along the guide route and performs the automated valet parking into the parking space after reaching the vicinity of the corresponding parking space. In (4), the driver decides to take the vehicle out of the parking space and move the vehicle to the pick-up area.

In (5), the infrastructure determines a suitable target position. For example, the suitable target position may be an empty parking space among a plurality of parking spaces which exist within the pick-up area. Further, the infrastructure determines a guide route to the determined target position. When the target position and the guide route are determined, the vehicle travels autonomously along the guide route, and performs the automated valet parking into the parking space after reaching the vicinity of the parking space. In (6), the driver reaches the pick-up area, and the driving authority is transferred from the infrastructure to the driver. The driver drives the vehicle and moves to the exit of the parking lot.

FIGS. 4A and 4B are block diagrams for explaining operations performed by an infrastructure and a vehicle which perform the automated valet parking according to the present disclosure.

In (1), operations of the infrastructure (e.g., the infrastructure 100 illustrated in FIG. 1) and the vehicle (e.g., the automated valet parking apparatus 200 illustrated in FIG. 1) for initiating (or starting) the automated valet parking are described. The infrastructure detects drivers and vehicles and determines whether they are suitable drivers and vehicles. For example, the infrastructure uses the identification (ID) and password input by a driver to determine whether the driver is a suitable driver. Further, the infrastructure uses the unique number of a vehicle to determine whether the vehicle is a suitable vehicle. The vehicle may turn on/off an engine. Further, the vehicle may turn on/off the power to the vehicle. For example, a state where the engine of the vehicle is turned off but the power thereof is turned on may be an accessory-on (ACC on) state.

The engine on/off and power on/off of the vehicle may be performed by receiving the command from the infrastructure or may be autonomously performed by the vehicle without the command of the infrastructure. The vehicle may lock/unlock the door. The locking and unlocking of the door of the vehicle may be performed by receiving the command from the infrastructure or may be autonomously performed by the vehicle without the command of the infrastructure. When the vehicle proceeds to the automated parking stage, the door of the vehicle may be locked. Further, the driving authority of the vehicle may be transferred from the vehicle to the infrastructure. The driving authority is an authority for executing the operation of the vehicle, and the operation of the vehicle is a steering operation, an acceleration operation, a braking operation, a gear shift operation, an operation to turn on/off the start-up of the vehicle, and an operation to lock/unlock the door of the vehicle. By transferring the authority of the vehicle to the infrastructure, the infrastructure may fully operate the corresponding vehicle while the vehicle performs the automated valet parking.

Accordingly, the possibility of unintended operation of the vehicle is reduced and a vehicle accident within the parking lot may be prevented. However, in some cases, a part of the driving authority may be maintained by the vehicle without being transferred from the vehicle to the infrastructure, or a part of the driving authority may be jointly maintained by the vehicle and the infrastructure. For example, the braking operation may be required to be performed when an emergency occurs in a situation in which the automated valet parking is being performed. When the vehicle senses a danger using an ADAS sensor or the like, the vehicle may perform the braking operation by itself without the control of the infrastructure. Further, the vehicle may determine whether there are humans or animals inside the vehicle.

Accordingly, the risk which may be caused when a human or an animal exists inside the vehicle may be reduced since it takes a considerable amount of time to complete the automated valet parking according to the present disclosure and take the vehicle out of the parking space. Whether the human or the animal exists inside the vehicle may be determined using a sensor mounted to the vehicle. Meanwhile, the driving authority may be autonomously transferred from the vehicle or the infrastructure to the driver when the automated valet parking is completed.

An operation when the vehicle exits the parking lot is similar to an operation when the vehicle enters the parking lot. Specifically, the vehicle receives a taking-out (e.g., exiting) request. The driver (e.g., the owner or user of the vehicle) may request the vehicle to exit the parking lot using a device capable of communicating with the infrastructure. When the driver requests the vehicle to exit the parking lot, the driver may transfer information about the vehicle and personal information of the driver to the infrastructure (e.g., via a terminal or the like), and the infrastructure may determine whether the vehicle to exit the parking lot is actually parked in the parking lot, based on the input information, and determine whether the driver requesting the vehicle to exit from the parking lot is a suitable driver. When the vehicle receives the taking-out request, the vehicle or the infrastructure may confirm whether there are no people in the vehicle, and may proceed to a subsequent step if there are no people in the vehicle.

When the driver transmits the taking-out request, the driving authority may be transferred (or handed over) from the driver to the vehicle or the infrastructure. In other words, when the driver transmits the taking-out request, the driver loses a control authority of the vehicle, and the vehicle may operate under an operate of the infrastructure or an operation of the vehicle itself. For example, under the operation of the vehicle or the infrastructure, the door of the vehicle may be autonomously locked when the vehicle leaves the parking position, and the door of the vehicle may be autonomously opened when the vehicle reaches the pick-up area. When the vehicle reaches the pick-up area, the driving authority may be transferred from the infrastructure or the vehicle to the driver.

Meanwhile, as described above, in some cases, a part of the driving authority may be maintained by the vehicle without being transferred from the vehicle to the infrastructure, or a part of the driving authority may be jointly maintained by the vehicle and the infrastructure. After receiving the taking-out or exiting request, the vehicle receives a taking-out signal from the infrastructure and starts to exit from the parking space according to the automated valet parking. Before the vehicle starts to exit from the parking space, the infrastructure may start up the vehicle. The infrastructure may transmit a notification to the driver that indicates that the vehicle has started to exit the parking space.

In (2), a target position, a guide route, and a driving route may be determined. The infrastructure may determine the target position, the guide route, and the driving route. The target position, the guide route, and the driving route determined by the infrastructure may be transferred from the infrastructure to the vehicle. The target position, the guide route, and the driving route may be transferred to the vehicle when the vehicle enters and exits the parking lot.

The target position may be a final destination that the vehicle is required to move and reach. According to an exemplary embodiment, the target position is an empty parking space within the parking lot where the vehicle is to be parked, in a situation in which the vehicle enters the parking lot. According to another exemplary embodiment, the target position may be an empty parking space within the pick-up area in a situation in which the vehicle exits the parking lot. However, this is only illustrative, and exemplary embodiments of the present disclosure are not limited thereto. For example, the target position may also be a specific point around the empty parking space instead of the empty parking space.

For example, when several empty parking spaces are present in a row or adjacent to each other in a specific area within the parking lot, a specific point around these multiple empty parking spaces may also be understood as being the target position. In particular, after moving to the corresponding specific point, the vehicle may activate the automated parking function of an Advanced Driver Assistance System (ADAS) mounted to the vehicle to be parked in the desired parking space. The automated parking function among the ADAS may be, for example, a Partially Automated Parking System (PAPS). According to this example, efficiency may be further increased in managing the parking available space. In other words, the infrastructure may recognize only a rough point instead of calculating an accurate target position, thereby reducing energy required for processing.

The guide route is a route that the vehicle is required to follow for automated driving. For example, the guide route may be configured as forms such as moving forward by about 10 m, turning right at the first corner, and turning left after moving forward by about 20 m. Alternatively, the guide route may include straight lines, curves, or a combination thereof from the current position to the target position within a parking lot map. Alternatively, the guide route may include a plurality of passing positions and one target position within the parking lot map. For example, the guide route may include, as the plurality of passing positions, a pillar A1, a pillar B2, and a pillar C3 and includes, as the target position, a parking slot D23. As described above, if the guide route is not composed of a straight line or a curve but composed of the passing position and the target position, information about the straight line, the curve, or the distance (such as about 10 m) is not required, such that it may be possible to reduce an amount of information which is required for the communication between the vehicle and the infrastructure (V2I or the like).

The aforementioned guide route may be transmitted from the infrastructure to the vehicle using a light emitting device. The light emitting device may be, for example, an LED lamp. The light emitted by the light emitting device may be displayed on the floor within the parking lot. Accordingly, the light emitting device may be an LED lamp embedded inside the floor of the parking lot. Alternatively, the light emitting device may be a laser lamp which is installed to a ceiling, an outer wall, or a column within the parking lot to emit light toward the floor of the parking lot. The vehicle may receive or recognize the guide route by sensing light emission by using a mounted sensor. For example, the vehicle may sense light emission by using a mounted front camera sensor.

In (3), the automated driving of the vehicle may be performed within the parking lot. The automated driving of the vehicle includes movement, stop, and movement restart of the vehicle. The automated driving of the vehicle may be performed by the vehicle according to a command transmitted from the infrastructure to the vehicle. Alternatively, the automated driving of the vehicle may not depend on the command from the infrastructure, but be autonomously performed by the vehicle. The vehicle may autonomously travel to the target position along the guide route within the permitted driving area. In the case of the automated driving without the driver, the vehicle may be operated to travel at a speed that is less than a predetermined speed. This predetermined speed may be a value transferred from the infrastructure to the vehicle or may be a value stored in the vehicle.

Further, the vehicle may be operated to travel without deviating from a predetermined error in the given guide route in performing the automated driving along the guide route. This predetermined error may be a value transferred from the infrastructure to the vehicle or may be a value stored in the vehicle. Further, when the vehicle is required to perform turning in performing the automated driving along the guide route, the vehicle may follow a predetermined minimum rotational radius. This predetermined minimum rotational radius may be a value transferred from the infrastructure to the vehicle or may be a value stored in the vehicle. The vehicle may be operated not to exceed a predetermined maximum acceleration in performing the automated driving along the guide route. This predetermined maximum acceleration may be a value transferred from the infrastructure to the vehicle or may be a value stored in the vehicle.

In (4), a position may be measured. The target of the position measurement may be a vehicle which performs parking, an obstacle which exists within the parking lot, or a vehicle which has already been parked. The infrastructure may measure the position of the vehicle or the obstacle and store the position of the vehicle in a database. The infrastructure may identify and detect vehicles or obstacles and monitor the safety of each of a plurality of vehicles which perform parking. Further, the infrastructure may monitor the operation of the vehicle which reaches the target position to perform parking, and transfer a command. The vehicle may measure its own position.

The vehicle may transfer its own measured position to the infrastructure. The error of the vehicle's own position measured may be within a predetermined error range, and the predetermined error may be a value determined by the infrastructure. The vehicle may sense the surroundings to measure the position of the existing obstacle, and transmit the measured position of the obstacle to the infrastructure. The frequency used for the communication between the vehicle and the infrastructure may be a predetermined frequency.

According to an exemplary embodiment, the vehicle may consider at least a part of the environmental information when measuring the position. For example, the environmental information may include at least one among parking lot slot information, road signs, walls, columns, and floor markings. For example, the vehicle may measure a position using a particle filter-based positioning technique, and give a weight to a particle based on at least a part of the environmental information. As a result, it may be possible to solve the conventional problem in that the position of the vehicle is not accurately measured in the indoor parking lot, with a GNSS/DR fusion technique.

In (5), automated parking may be performed. The automated parking refers to automated parking of a vehicle which reaches the vicinity of the target position to enter an empty parking space. The vehicle may perform the automated parking by sensing an obstacle or a vehicle parked in the vicinity thereof by using a distance sensor mounted to the vehicle itself. The distance sensor mounted to the vehicle may include, for example, an ultrasonic sensor, a radar sensor, a lidar sensor, and a camera.

In (6), the emergency brake of the vehicle may be performed. The emergency brake of the vehicle may be performed according to the command transferred from the infrastructure or may be performed by itself when the vehicle detects an obstacle. If the infrastructure determines that the vicinity of the vehicle is unsafe, the infrastructure may instruct the vehicle to perform the emergency brake. If the infrastructure determines that the vicinity of the vehicle is safe after the vehicle has performed the emergency brake, the infrastructure may instruct the vehicle to restart the automated driving or the automated parking. When detecting an obstacle, the vehicle may perform the emergency brake. Further, the vehicle may report the operation of the emergency brake to the infrastructure and may report the type or position of the obstacle, which is responsible for the emergency brake, to the infrastructure.

The magnitude of the deceleration when the vehicle performs the emergency brake may follow a predetermined deceleration value, and the predetermined deceleration value may be a value determined by the infrastructure or may be a value stored in the vehicle. The predetermined deceleration value may be determined according to the type of obstacle, the position of the obstacle, and the distance between the corresponding vehicle and the obstacle. In response to receiving the restart command of the automated driving or the automated parking from the infrastructure, the vehicle may restart the automated driving or the automated parking. Alternatively, the vehicle may restart the automated driving or the automated parking in response to determining that neighboring obstacles have been eliminated. The vehicle may report to the infrastructure that the automated driving or the automated parking has been restarted, and the neighboring obstacles have been eliminated.

The vehicle may sense whether a human or an animal are present within the vehicle and perform the emergency brake in response to determining that the human or the animal exists inside the vehicle. The vehicle may restart the automated parking or the automated driving by receiving the command from the infrastructure after performing the emergency brake. Alternatively, the vehicle may determine whether the cause of performing the emergency brake has been eliminated and restart the automated parking or the automated driving when the cause is eliminated.

In (7), the automated valet parking is terminated (or ended). After the vehicle has completed the automated driving and the automated parking, the infrastructure transfers a control release command to the vehicle. The vehicle may perform engine on/off or power on/off by receiving the command of the infrastructure or without relying on the command of the infrastructure. Further, the vehicle may lock the door of the vehicle by receiving the command of the infrastructure or without relying on the command of the infrastructure. The vehicle may execute the parking brake of the vehicle by receiving the command of the infrastructure or without relying on the command of the infrastructure.

In (8), an error control may be performed. The error control may include a communication error between the vehicle and the infrastructure or a mechanical error of the vehicle. The infrastructure may monitor the communication with the vehicle and detect whether the communication error is generated. The vehicle may monitor the communication with the infrastructure and detect whether the communication error is generated. The vehicle may monitor an operating state of an accessory including a sensor mounted to the vehicle itself and detect whether the mechanical error is generated.

FIG. 5 is a diagram for explaining communication between the infrastructure and the vehicle which perform the automated valet parking according to the present disclosure. In (1), vehicle qualification information may be transferred from the vehicle to the infrastructure. The vehicle qualification information may include an identifier which may distinguish each vehicle from other vehicles. For example, the vehicle qualification information may be a unique number of the vehicle. The vehicle qualification information may be transferred at a stage in which the automated valet parking is started (see (1) in FIG. 4A) after the vehicle enters the parking lot.

In (2), an automated valet parking preparation command may be transferred from the infrastructure to the vehicle. The automated valet parking preparation command may be transferred before the vehicle starts the automated driving. In (3), vehicle information may be transferred from the vehicle to the infrastructure. The vehicle information may include state information of the vehicle and position information of the vehicle. The state information of the vehicle may include whether the vehicle is traveling, whether the vehicle is stopped, or whether the vehicle is emergently stopped. The vehicle information may be periodically transferred and may be transferred at a specific frequency (e.g., once every second, that is, 1 Hz). Accordingly, the vehicle information may be used as a parameter which determines whether a communication error has been generated between the vehicle and the infrastructure. For example, when the vehicle information is not transferred to the infrastructure at a scheduled time point according to the communication frequency, the infrastructure may determine that the communication error has been generated between the vehicle and the infrastructure.

In (4), a vehicle information response may be transferred from the infrastructure to the vehicle. The vehicle information response may be transferred at the same frequency as the vehicle information in response to the vehicle information in (3). Accordingly, the vehicle information response may be used as a parameter which determines whether the communication error has been generated between the vehicle and the infrastructure. For example, when the vehicle information response is not transferred to the vehicle at a scheduled time point according to the communication frequency, the vehicle may determine that the communication error has been generated between the vehicle and the infrastructure.

In (5), a target position and a guide route may be transferred from the infrastructure to the vehicle. The target position and the guide route may be transferred before or after an automated valet parking start command is transferred from the infrastructure to the vehicle. In (6), a driving boundary may be transferred from the infrastructure to the vehicle. The driving boundary may include landmarks (e.g., parking lines, center lines, and road boundary lines) which defines the boundary with the permitted driving area. The driving boundary may be transferred after the automated valet parking preparation command is transferred. This driving boundary may be transferred from the infrastructure to the vehicle in the form of a parking lot map.

In (7), the automated valet parking start command may be transferred from the infrastructure to the vehicle. The automated valet parking start command may be transferred after the guide route and the driving boundary are transferred. Further, the automated valet parking start command may be transferred after the emergency brake of the vehicle is performed and safety around the vehicle is confirmed. In (8), an emergency brake command may be transferred from the infrastructure to the vehicle. In (9), a vehicle control release command may be transferred from the infrastructure to the vehicle. The vehicle control release command may be transferred after the vehicle has completed the automated parking into the parking space.

Figure 6:
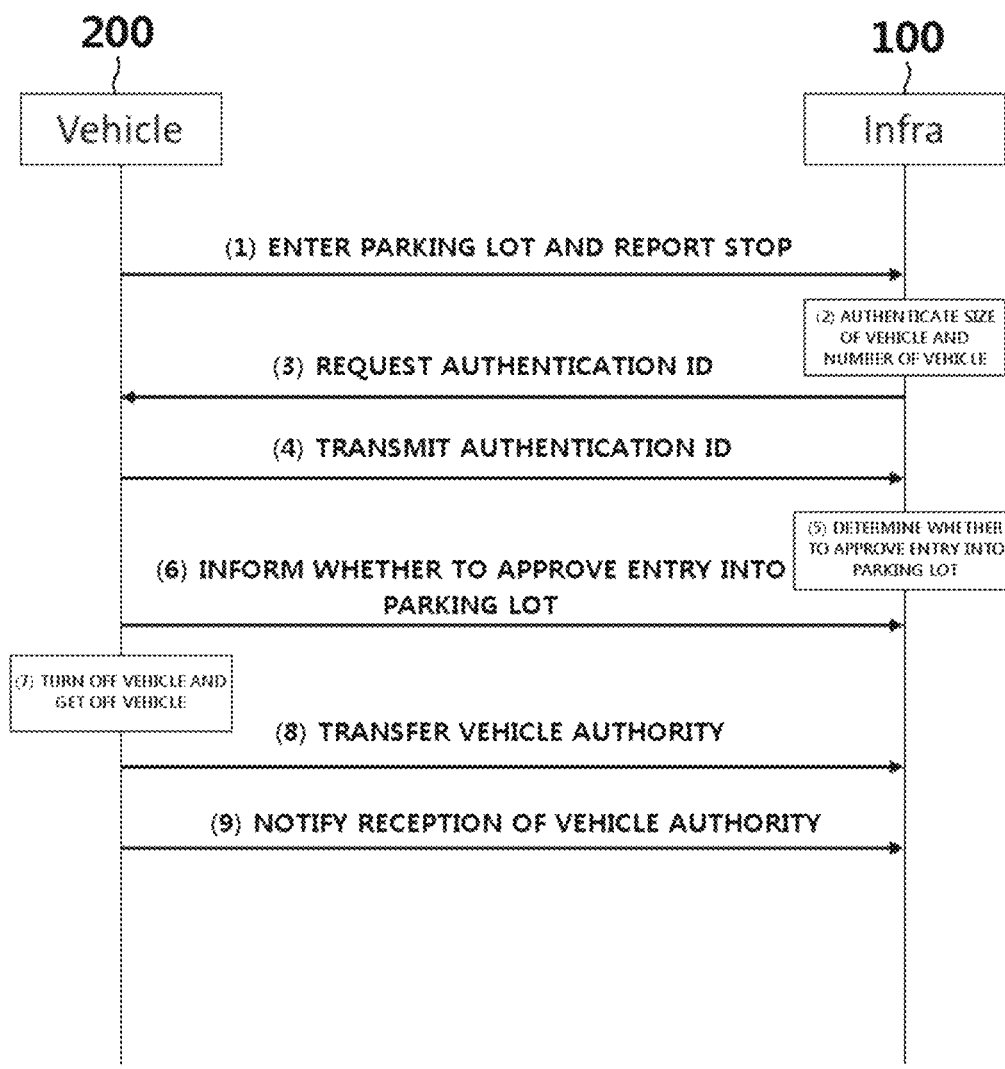
FIG. 6 is a diagram for explaining communication between the infrastructure and the vehicle, which perform the automated valet parking according to an exemplary embodiment of the present disclosure.

FIG. 6 is a diagram for explaining communication between the infrastructure 100 and the vehicle 200 which perform the automated valet parking according to the present disclosure.

In (1), the vehicle 200 enters the parking lot passage and stops at the stop position. The stop position may be a parking lot entrance gate. The vehicle 200 reports to the infrastructure 100 that the vehicle 100 has reached the stop position. In (2), the infrastructure 100 authenticates the size of the vehicle 200 and the number of the vehicle 200. In (3), the infrastructure 100 transmits an authentication ID request to the vehicle 200, and in (4), the vehicle 200 transmits the authentication ID to the infrastructure 100. In (5), the infrastructure 100 determines whether to approve the entry of the vehicle 200 into the parking lot, based on the received authentication ID. In (6), the infrastructure 100 provides a notification to the corresponding vehicle 200 as to whether the entry of the corresponding vehicle 200 into the parking lot is approved, based on the received authentication ID.

For example, the infrastructure 100 may display approval or disapproval through a monitor which is disposed around the stop position. The driver of the vehicle 200 moves the vehicle 200 to the drop-off area when the entry into the parking lot is approved. In (7), the driver turns off the vehicle 200, exits the vehicle 200, and locks the door of the vehicle 200 and then leaves the drop-off area. In (8), the authority of the vehicle 200 is transferred from the vehicle 200 (or driver) to the infrastructure 100. Further, in (9), the infrastructure 100 provides a notification to the driver that the authority of the vehicle 200 has been received. This notification may be transmitted to a smart device of the driver via a mobile communication network.

Figure 7:
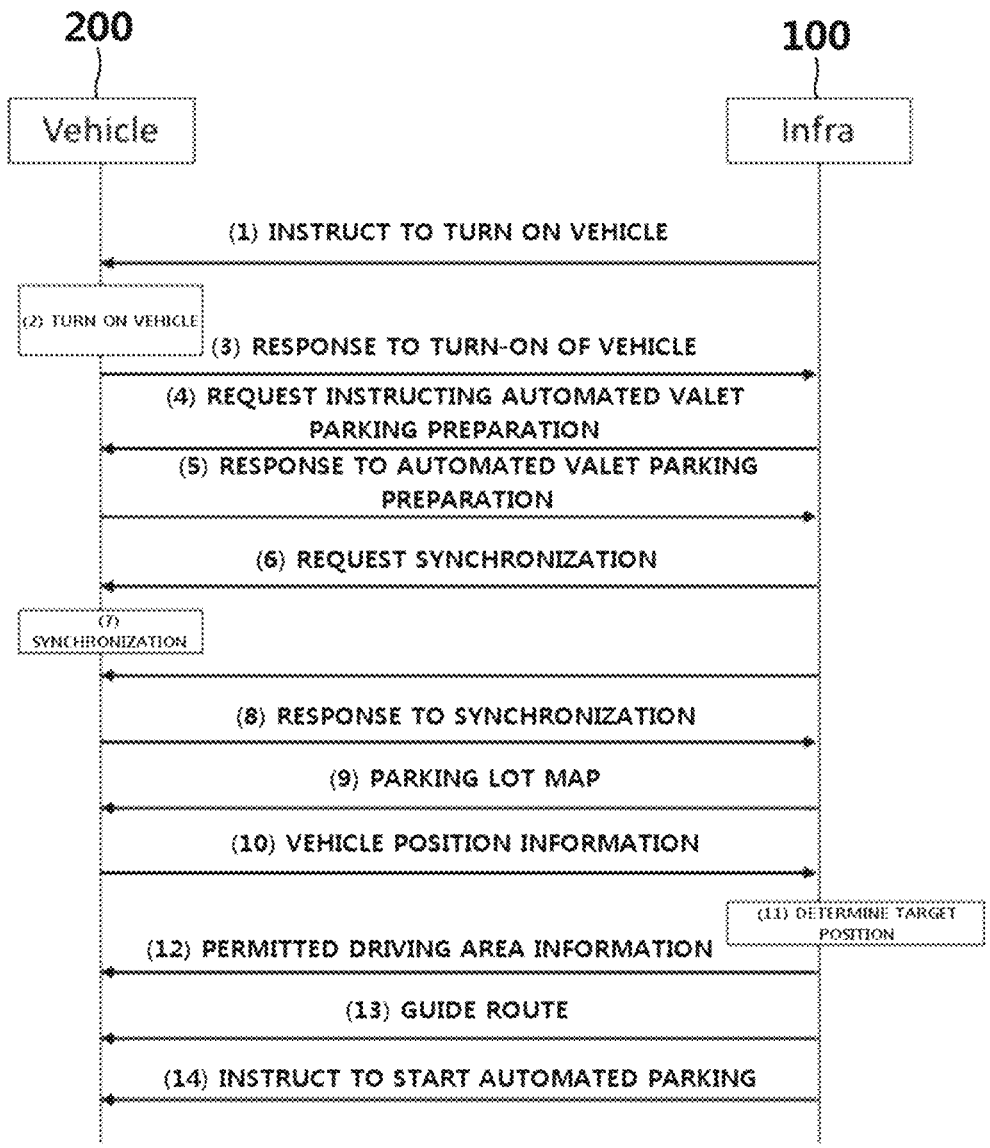
FIG. 7 is a diagram for explaining communication between the infrastructure and the vehicle, which perform the automated valet parking according to an exemplary embodiment of the present disclosure.

FIG. 7 is a diagram for explaining the communication between the infrastructure 100 and the vehicle 200 which perform the automated valet parking according to the present disclosure.

In (1), the infrastructure 100 may transmit a request instructing the turn-on of the vehicle 200 to the vehicle 200. In (2), the vehicle 200 may turn on the vehicle 200 in response to the request from the infrastructure 100. In (3), after the vehicle 200 turns on the vehicle 200, the response to the turn-on of the vehicle may be transmitted to the infrastructure 100. In (4), the infrastructure 100 may transmit a request instructing the automated valet parking preparation to the vehicle 200. In (5), the vehicle 200 may transmit a response indicating whether the automated valet parking is ready (OK) or not ready (NG), to the infrastructure 100 in response to the request for the automated valet parking preparation.

In (6), the infrastructure 100 may transmit a synchronization request to the vehicle 200. The synchronization request may be a request instructing the synchronization between the time of the infrastructure 100 and the time of the vehicle 200. For example, the synchronization request may include information about the time of the infrastructure 100. In (7), the vehicle 200 may perform synchronization in response to the synchronization request. In (8), the vehicle 200 may transmit a response indicating that the synchronization has been completed, to the infrastructure 100.

For example, a plurality of synchronization requests may be transmitted from the infrastructure 100 to the vehicle 200 until the synchronization between the infrastructure 100 and the vehicle 200 is completed. In (9), the infrastructure 100 may transmit parking lot map information to the vehicle 200. The parking lot map information may include landmark information. In (10), the vehicle 200 may estimate (or calculate) the position of the vehicle 200 based on the transmitted landmark information, and the vehicle 200 may transmit the estimated position of the vehicle 200 to the infrastructure 100. In (11), the infrastructure 100 may determine a target position (parking position). In (12), the infrastructure 100 may transmit information about the permitted driving area to the vehicle 200. For example, the infrastructure 100 may transmit the boundary of the permitted driving area to the vehicle 200. In (13), the infrastructure 100 may transmit the guide route to the vehicle 200. In (14), the infrastructure 100 may transmit a command instructing the start of the automated valet parking to the vehicle 200.

Figure 8:
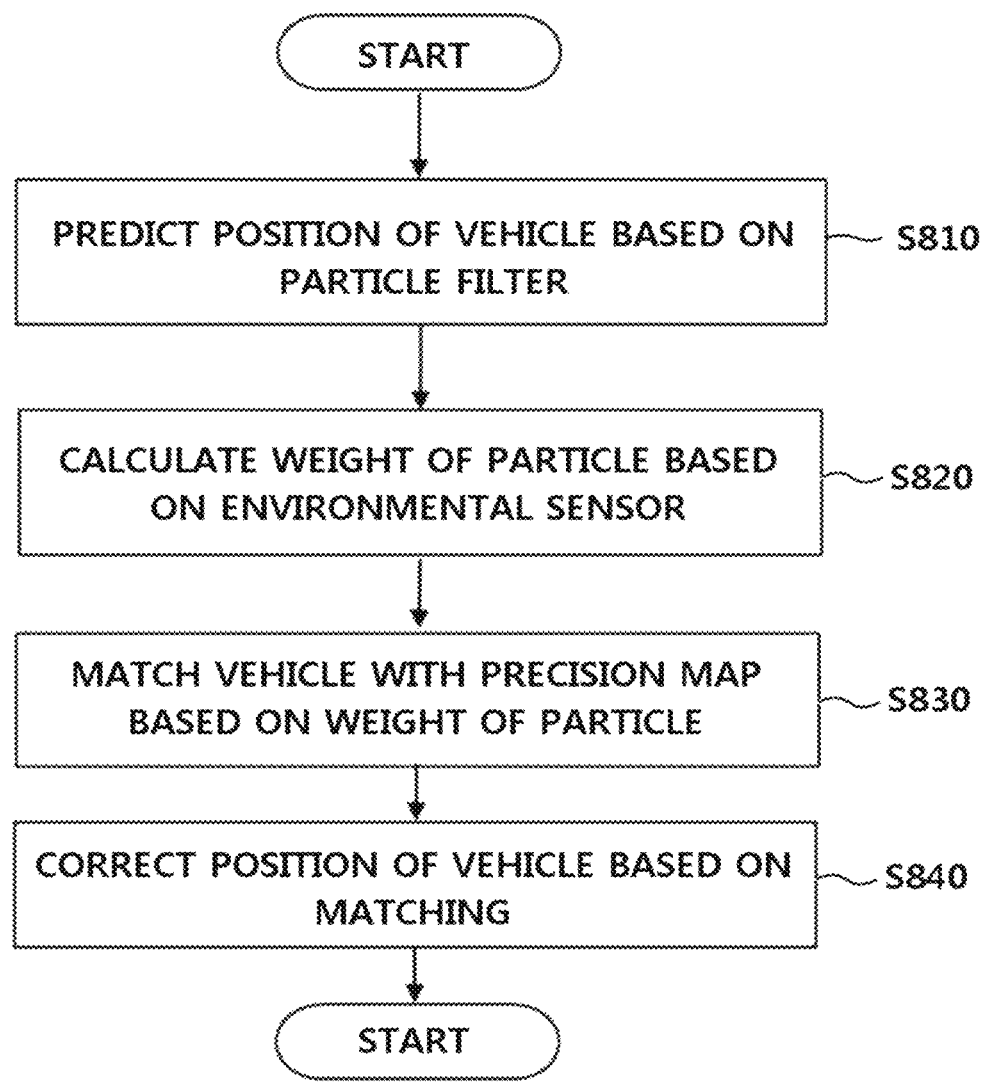
FIG. 8 is a flowchart illustrating a position measuring operation of the vehicle which supports the automated valet parking according to an exemplary embodiment of the present disclosure.

FIG. 8 is a flowchart illustrating a position measurement operation of the vehicle which supports the automated valet parking according to the present disclosure. Further, FIGS. 9 to 13 are diagrams for explaining an operation of measuring the position of the vehicle based on an environmental sensor according to the present disclosure. The operations described below may indicate various exemplary embodiments of (4) of FIG. 4A. Referring to FIG. 8, in operation S810, the vehicle (e.g., the automated valet parking apparatus 100 illustrated in FIG. 1) may predict the position of the vehicle based on a particle filter. The prediction based on the particle filter may include an operation of setting an initial position and an operation of predicting a position of the vehicle.

According to an exemplary embodiment, to perform the operation of setting the initial position, the vehicle may select N particles which refer to an arbitrary position in the vicinity of the vehicle (e.g., within a range of 2 m around the vehicle). Further, the vehicle may perform the operation of setting the initial position by setting the initial value of at least one selected particle to be the same as a known position of the vehicle (e.g., a position acquired through the GNSS-based positioning).

Additionally, to perform an operation of predicting a position of the vehicle, the vehicle may predict the position and direction of the particle based on the movement of the vehicle. For example, the movement of the vehicle may be determined based on a behavior sensor (e.g., an acceleration sensor, a wheel speed sensor, a yaw rate sensor, or the like), and predict the position of the particle which is moved by the moving amount based on the moving amount of the vehicle. Further, the vehicle may predict the direction of the particle by applying a rotational value, which is proportional to the amount of rotation of the vehicle, to the particle. Additionally, the vehicle may predict the direction of the vehicle based on a shift state of the vehicle (e.g., forward shift or reverse shift), and may also predict the direction of the particle based on the shift state of the vehicle.

In operation S820, the vehicle may calculate the weight of the particle based on the environmental sensor. According to an exemplary embodiment, the vehicle may determine the weight of the particle based on the similarity between the environmental information (e.g., parking lot slot information, road signs, walls, pillars, and the like) acquired based on the environmental sensor and the environmental information which exists on the precision map. For example, the particle related to the environmental information having a high similarity may have a relatively high weight, and the particle irrelevant thereto may have a relatively low weight.

According to various exemplary embodiments, the vehicle may extract a first parking slot by using a first environmental sensor, for example, at least one camera mounted to the vehicle, and may determine the weight of the particle based on the extracted first parking slot. The at least one camera may include a surround view monitor (SVM) camera or an around view monitor (AVM) camera configured to acquire the neighboring image of the vehicle.

Figure 9:
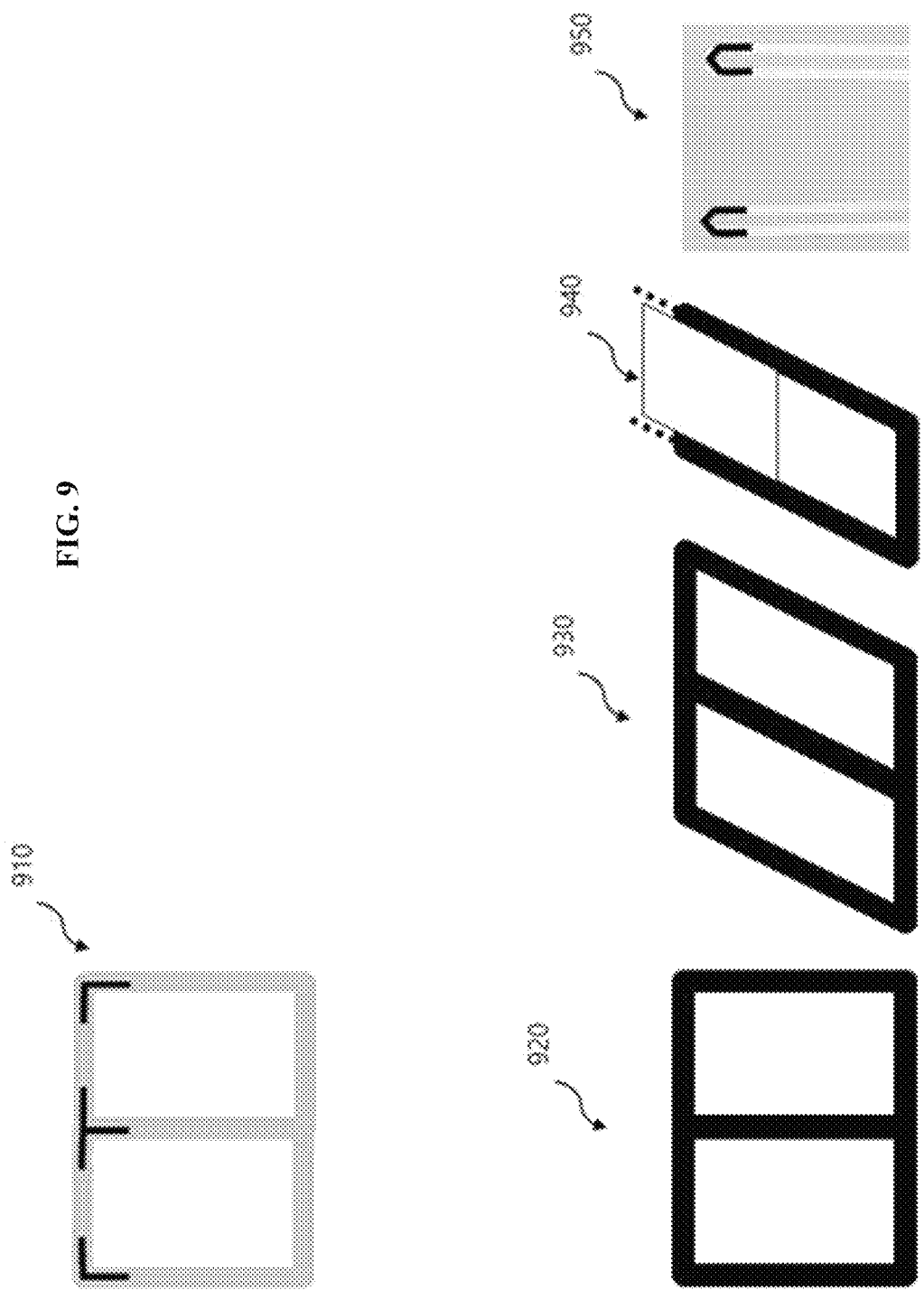
FIG. 9 is a diagram for explaining an operation of assigning a weight to a particle based on a parking slot line, in the vehicle according to an exemplary embodiment of the present disclosure.

According to an exemplary embodiment, as illustrated in FIG. 9, the vehicle may extract a part of the parking line, for example, a corner line, as a first parking slot 910. Further, the vehicle may acquire one or more parking slot templates 920 to 950 based on at least one particle, which exists at the predicted position, and the precision map, and compare the one or more parking slot templates 920 to 950 with the first parking slot 910 to confirm a second parking slot 920 which matches with the first parking slot 910. For example, the second parking slot may be a parking slot having the highest similarity to the first parking slot 910 among the parking slots on the precision map. For example, the vehicle may transform a first parking slot image into a grayscale image and then apply a top-hat filter to the grayscale image, and may confirm the matching parking slot from the parking slot templates. Further, the vehicle may give a relatively high weight to the particle related to the second parking slot.

According to various exemplary embodiments, the vehicle may sense other vehicles and at least one first fixed obstacle (for example, pillar) present around the vehicle by using a second environmental sensor, for example, a lidar, a radar, and the like and determine the weight of the particle based on the sensed vehicles and the at least one first obstacle.

Additionally, the vehicle may acquire at least one obstacle template based on at least one particle, which is present at the predicted position, and the precision map, and compare the acquired at least one obstacle template with the first obstacle to confirm a second obstacle which matches with the first obstacle. The second obstacle may be an obstacle having a highest similarity to the first obstacle among the obstacles on the precision map. For example, the vehicle may transform distance information, acquired through the environmental sensor, into a binary image, and apply a distance transform to the binary image to determine an interesting area where the obstacle is present among the distance information acquired through the environmental sensor.

Figure 10:
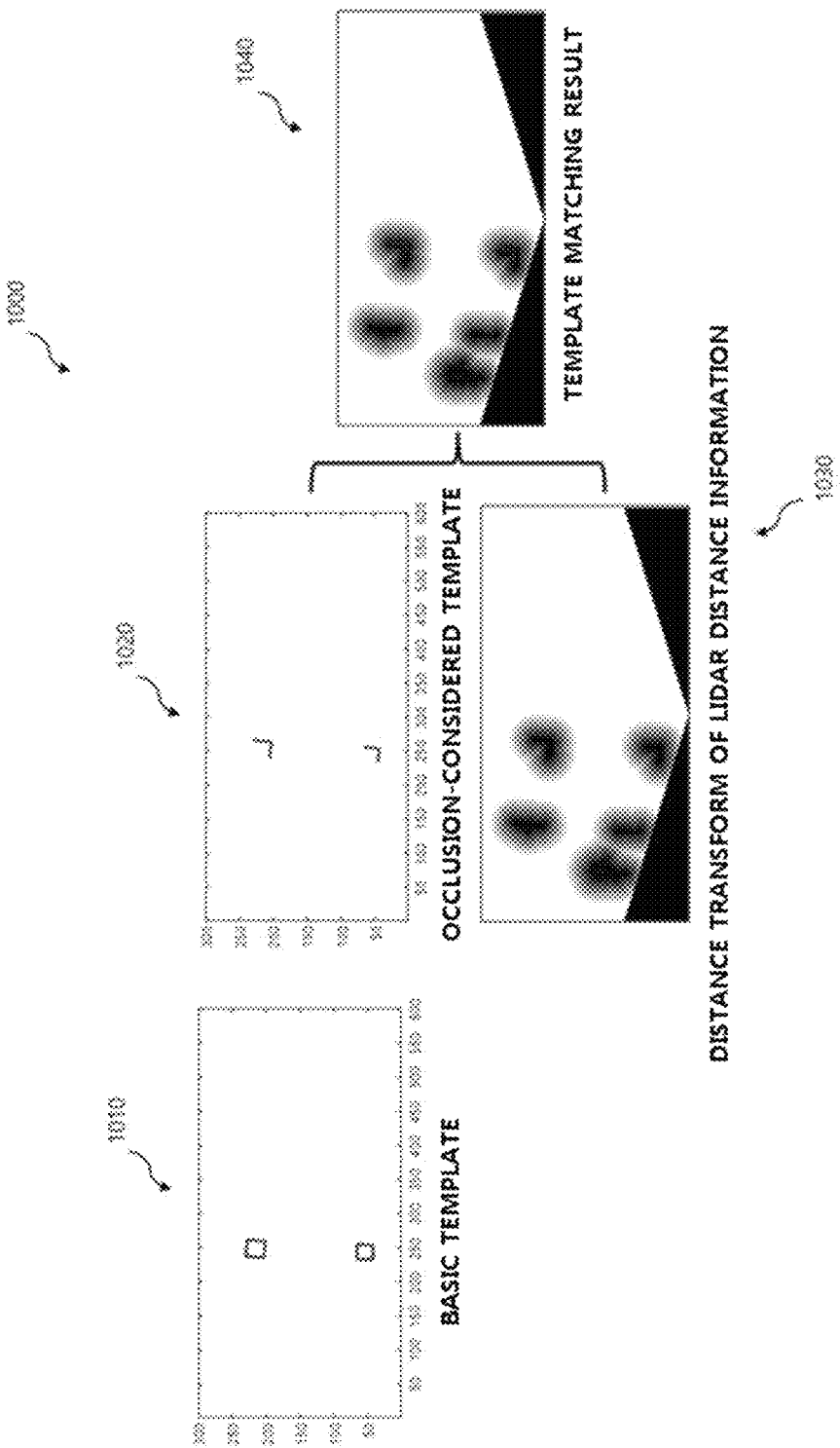
FIG. 10 is a diagram for explaining an operation of assigning a weight to the particle based on a fixed obstacle, in the vehicle according to an exemplary embodiment of the present disclosure.
Figure 11:
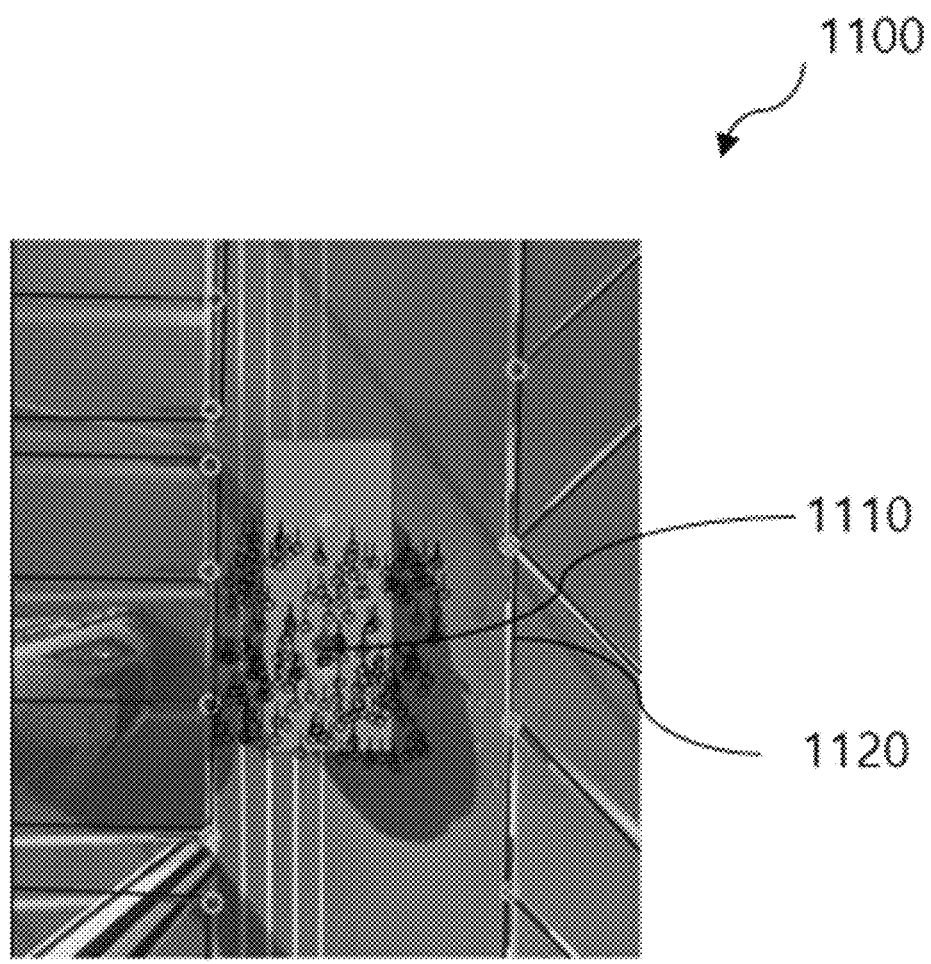
FIG. 11 is a diagram for explaining an operation of correcting a position of the vehicle based on the parking slot line, in the vehicle according to an exemplary embodiment of the present disclosure.
Figure 12:
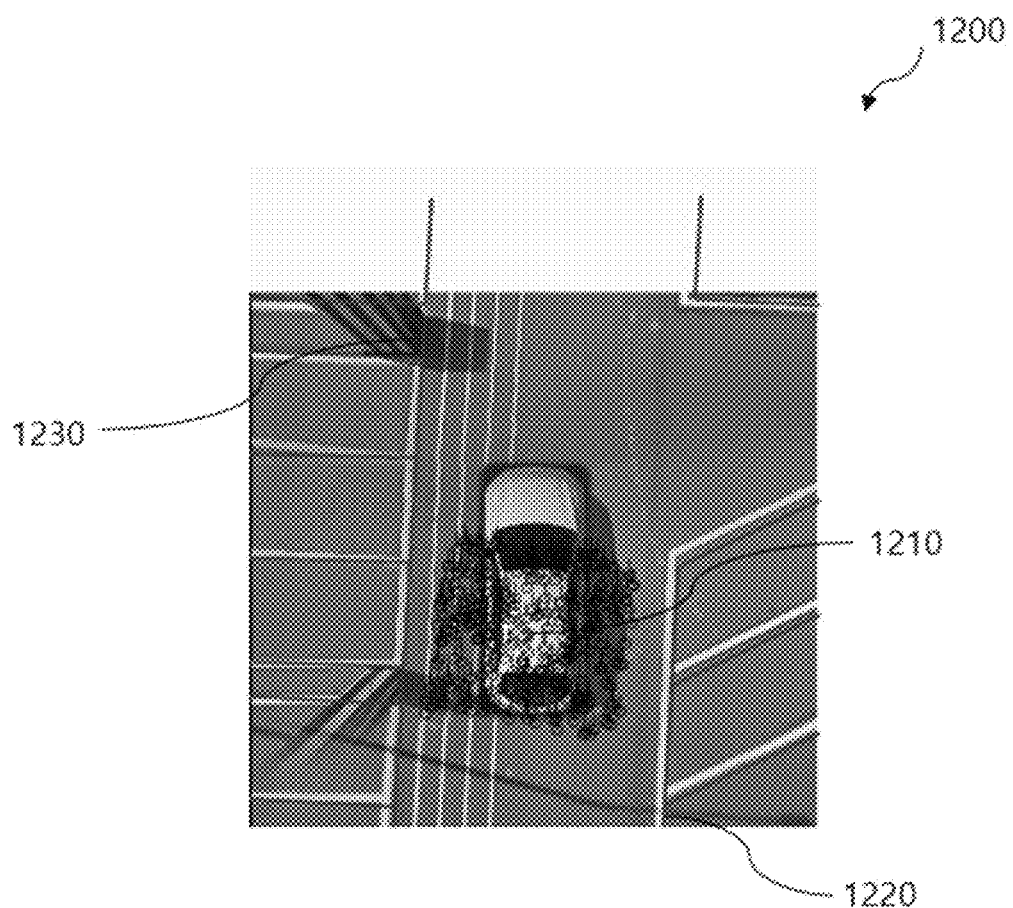
FIG. 12 is a diagram for explaining an operation of correcting the position of the vehicle based on the fixed obstacle, in the vehicle according to an exemplary embodiment of the present disclosure.

Further, as illustrated in FIG. 10, the vehicle may acquire, as a basic template 1010, the obstacle existing on the precision map and having a similar shape to the first obstacle, and calculate, in 1040, a similarity by defining, as an obstacle template 1020, only the portion of the acquired basic template exposed to a sensing direction of the environmental sensor to compare the obstacle template 1020 with the interesting area 1030. This may solve the problem in that the similarity is not accurately measured because the shape of the first obstacle acquired through the environmental sensor is a part of the shape of the actual first obstacle based on the sensing direction, and the shape of the first obstacle is different from the overall shape of the first obstacle expressed in a reference template.

In operation S830, the vehicle may match the vehicle with the precision map based on the weight of the particle. According to an exemplary embodiment, as illustrated in 1120 of FIG. 11, the vehicle may match the parking slot on the precision map with the image, acquired using at least one camera mounted to the vehicle, based on the particle (for example, red dot) 1110 having the highest weight. According to another exemplary embodiment, as illustrated in 1200 of FIG. 12, the vehicle may match 1200 the parking slot 1220 on the precision map and the shape of the obstacle 1230 with the image, acquired by using at least one camera mounted to the vehicle, based on the particle having the highest weight (for example, red dot) 1210.

In operation S840, the vehicle may correct the position of the vehicle based on the matching. According to an exemplary embodiment, the vehicle may correct the position of the vehicle, predicted based on the particle filter, based on the matching. The vehicle may improve the position measurement performance of the vehicle by fusing the environmental information collected through the first environmental sensor and the environmental information collected using the second environmental sensor. For example, in the case of measuring a position using only the first environmental sensor, a positioning error may be generated in a section without a parking slot, and in the case of measuring a position using only the second environmental sensor, a positioning error may be generated in a section without a fixed obstacle, but the vehicle according to the present disclosure may reduce the positioning error by fusing the first environmental sensor and the second environmental sensor, thereby more accurately measuring the position of the vehicle even in an indoor parking lot where GLANS-based positioning is not possible.

In the aforementioned exemplary embodiment, the configuration in which the vehicle measures the position of the vehicle based on the particle filter and the environmental information has been described. However, this is only illustrative, and embodiments of the present disclosure are not limited thereto. For example, the infrastructure may also measure the position of the vehicle based on the particle filter and the environmental information.

According to various exemplary embodiments, a method for operating a vehicle which supports automated valet parking may include initiating automated valet parking, receiving, from an infrastructure, a target position which is related to the vehicle and a guide route which guides the movement to the target position, performing automated driving by the vehicle along the guide route, and measuring the position of the vehicle based on behavior information of the vehicle and environmental information, while the vehicle performs the automated driving. According to an exemplary embodiment, the environmental information may include at least one of parking lot slot information, road signs, walls, columns, and floor markings. Further, according to an exemplary embodiment, the behavior information of the vehicle may include at least one of acceleration information, angular velocity information, and shift information of the vehicle.

Further, the measuring of the position of the vehicle may include predicting the position of the vehicle based on the behavior information of the vehicle and a particle filter, calculating a weight of a particle based on at least one environmental sensor mounted to the vehicle, and correcting the predicted position of the vehicle based on the weight of the particle. According to various exemplary embodiments, the predicting of the position of the vehicle may include acquiring a first parking slot from an image which is acquired through a first environmental sensor mounted to the vehicle, acquiring at least one parking slot template corresponding to the first parking slot based on at least one particle, which is present at the predicted position of the vehicle, and a precision map, acquiring a second parking slot which matches with the first parking slot among the parking slot templates, and assigning a relatively high weight to the particle related to the second parking slot.

Further, the acquiring of the second parking slot which matches with the first parking slot among the parking slot templates may include calculating the similarity between the first parking slot and the parking slot template, based on a top-hat filter. According to various exemplary embodiments, the first environmental sensor may include a surround view monitor (SVM) camera.

The predicting of the position of the vehicle may include calculating a distance to a first obstacle, which is present in the vicinity of the vehicle, through a second environmental sensor mounted to the vehicle, acquiring at least one obstacle template corresponding to the distance based on at least one particle, which is present at the predicted position of the vehicle, and the precision map, acquiring a second obstacle which matches with the first obstacle among the obstacle templates, and assigning a relatively high weight to the particle related to the second obstacle.

According to various exemplary embodiments, the second environmental sensor may include at least one of a LIDAR and a radar. The obstacle template may include a portion of the shape of the first obstacle exposed to a sensing direction of the environmental sensor.

According to various exemplary embodiments, a method for performing automated valet parking may include initiating automated valet parking of a vehicle, transmitting a target position and a guide route from an infrastructure to the vehicle, performing the automated driving by the vehicle along the guide route, and providing measured position of the vehicle to the infrastructure by measuring a position of the vehicle based on the behavior information of the vehicle and environmental information, while the vehicle performs the automated driving. The environmental information may include at least one of parking lot slot information, road signs, walls, columns, and floor markings.

The behavior information of the vehicle may include at least one of acceleration information, angular velocity information, and shift information of the vehicle. Additionally, the providing of the position of the vehicle to the infrastructure may include predicting the position of the vehicle based on the behavior information of the vehicle and a particle filter, calculating a weight of a particle based on at least one environmental sensor mounted to the vehicle, and correcting the predicted position of the vehicle based on the weight of the particle.

Further, the providing of the position of the vehicle to the infrastructure may include acquiring a first parking slot from an image which is acquired using a first environmental sensor mounted to the vehicle, acquiring at least one parking slot template corresponding to the first parking slot based on at least one particle, which is present at the predicted position of the vehicle, and a precision map, acquiring a second parking slot which matches with the first parking slot among the parking slot templates, and assigning a relatively high weight to the particle related to the second parking slot.

According to various exemplary embodiments, the acquiring of the second parking slot which matches with the first parking slot among the parking slot templates may include calculating the similarity between the first parking slot and the parking slot template, based on a top-hat filter. The first environmental sensor may include a surround view monitor (SVM) camera.

The providing of the position of the vehicle to the infrastructure may include calculating a distance to a first obstacle, which is present in the vicinity of the vehicle, using a second environmental sensor mounted to the vehicle, acquiring at least one obstacle template corresponding to the distance based on at least one particle, which is present the predicted position of the vehicle, and a precision map, acquiring a second obstacle which matches with the first obstacle among the obstacle templates, and assigning a relatively high weight to the particle related to the second obstacle.

According to various exemplary embodiments, the second environmental sensor may include at least one of a LIDAR and a radar. The obstacle template may include a portion of the shape of the first obstacle exposed to a sensing direction of the environmental sensor.

In one or more exemplary embodiments, the described functions may be implemented in hardware, software, firmware, or any combination thereof. If the functions are implemented in software, these functions may be stored in or transmitted to a non-transitory computer readable medium as one or more commands or codes. The non-transitory computer readable media includes both a communication medium including any medium, which facilitates transfer of a computer program from one place to another place, and a computer storage medium. The storage medium may be any available medium which may be accessed by a computer. As an example without limitation, such computer readable media may be a RAM, ROM, EEPROM, CD-ROM or other optical disk storages, magnetic disk storages or other magnetic storage devices, or any other media which may be used to transfer or store the desired program code in the form of commands or the data structure and may be accessed by the computer.

Further, any connection is properly referred to as the computer readable medium. For example, if the software is transmitted from a website, server, or other remote sources by using a coaxial cable, a optic fiber cable, a twisted pair, a digital subscriber line (DSL), or wireless technologies such as infrared, radio, and ultra-high frequency, the coaxial cable, the optic fiber cable, the twisted pair, the DSL, or wireless technologies such as infrared, radio, and ultra-high frequency are included in the definition of the medium. The disk (disk and disc) used herein includes a compact disk (CD), a laser disk, an optical disk, a digital versatile disk (DVD), a floppy disk, and a Blu-ray disk, and the disks usually reproduce data magnetically, whereas the discs optically reproduce data by laser. Combinations of the aforementioned combinations should also be included within the scope of the computer readable media.

When embodiments are implemented as program codes or code segments, it should be noted that the code segments may represent procedures, functions, subprograms, programs, routines, subroutines, modules, software packages, classes, or any combination of commands, data structures, or program statements. The code segments may be connected to other code segments or hardware circuits by transferring and/or receiving information, data, arguments, parameters, or memory contents. Information, arguments, parameters, data, and the like may be transferred, sent or transmitted by using any suitable means including memory sharing, message transfer, token transfer, network transmission, and the like. Additionally, in some aspects, the steps and/or operations of the method or the algorithm reside as one of codes and/or commands or any combination or set thereof on a machine readable medium and/or a computer readable medium which may be integrated into a computer program product.

In a software implementation, the techniques described herein may be implemented by modules (for example, procedures, functions, and the like) which perform the functions described herein. The software codes may be stored in memory units and executed by processors. The memory unit may also be implemented within the processor and outside the processor, in which case the memory unit may be communicatively coupled to the processor by various means as publicly known.

In a hardware implementation, the processing units may be implemented within one or more application specific integrated circuits (ASICs), digital signal processor (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

The aforementioned description includes examples of one or more embodiments. Of course, not all possible combinations of components or methods may be described for the purpose of describing the aforementioned embodiments, but those skilled in the art may recognize that many additional combinations and substitutions of various embodiments are possible. Accordingly, the aforementioned embodiments are intended to cover all alternatives, modifications, and variations within the spirit and scope of the appended claims. Furthermore, for the extent to which the term "comprises" is used in the detailed description or claims, these terms are included in a similar manner to "consisting of" as the term "consisting of" is interpreted when used as a transitional word in the claims.

As used herein, the term "infer" or "inference" generally refers to the process of determining or inferring the state of a system, environment, and/or user from a set of observations which are captured by events and/or data. The inference may be used to identify a specific situation or operation, or may generate a probability distribution about the states, for example. The inference may be probabilistic, that is, the calculation of the probability distribution for corresponding states based on consideration on data and events. The inference may also refer to techniques used to configure higher level events from a set of events and/or data. This inference estimates whether a set of observed events and/or new events or operations from stored event data, and events are closed correlated in time, and whether events and data come from one or several events and data sources.

Furthermore, as used in the present application, the terms "component", "module", "system", and the like include, but are not limited to, computer-related entities such as hardware, firmware, a combination of hardware and software, software, or software being executed. For example, the component may also be, but is not limited to, a process executed on a processor, a processor, an object, an executable execution thread, a program, and/or a computer. For example, both an application running on a computing device and the computing device may be components. One or more components may reside within the process and/or the execution thread, and the component may also be centralized on one computer and/or may also be distributed between two or more computers. Further, these components may be executed from various computer readable media which store various data structures. The components may be communicated by a local and/or remote process such as following signals having one or more data packets (for example, data from other components of the local system and the distributed system and/or any component which interacts with other systems by signals via a network such as the Internet).

What is claimed is:

1. A method for operating a vehicle which supports automated valet parking, comprising:
   initializing automated valet parking;
   receiving from an infrastructure, a target position which is related to the vehicle and a guide route which guides movement to the target position;
   performing automated driving by the vehicle along the guide route; and
   measuring a position of the vehicle based on a map received from the infrastructure and environmental information, while the vehicle performs the automated driving,
   wherein the environmental information includes at least one of road signs, walls, and pillars; and
   wherein the environmental information is obtained based on at least one of lidar and a radar;
   wherein the measuring of the position of the vehicle comprises:
      setting an initial position of the vehicle based on the GNSS (Global Navigation Satellite System);
      estimating the position of the vehicle based on the initial position of the vehicle and behavior information of the vehicle; and
      correcting the estimated position of the vehicle based on the template having the highest similarity to the environmental information among templates of objects included in the map.

2. The method of claim 1,
   wherein the behavior information of the vehicle includes at least one among acceleration information, angular velocity information, and shift information of the vehicle.

3. The method of claim 1, wherein the estimating of the position of the vehicle includes predicting the position of the vehicle based on the behavior information of the vehicle and a particle filter; and
   wherein the correcting of the estimated position of the vehicle includes:
      calculating a weight of a particle based on at least one environmental sensor mounted to the vehicle; and
      correcting the predicted position of the vehicle based on the weight of the particle.

4. The method of claim 3, wherein the predicting of the position of the vehicle includes:
   acquiring a first parking slot from an image which is acquired using a first environmental sensor mounted to the vehicle;
   acquiring at least one parking slot template corresponding to the first parking slot based on at least one particle, which is present at the predicted position of the vehicle, and a precision map;
   acquiring a second parking slot which matches with the first parking slot among the parking slot templates; and
   assigning a relatively high weight to a particle related to the second parking slot.

5. The method of claim 4, wherein the acquiring of the second parking slot which matches with the first parking slot among the parking slot templates includes calculating the similarity between the first parking slot and the parking slot template, based on a top-hat filter.

6. The method of claim 4, wherein the first environmental sensor includes a surround view mirror (SVM) camera.

7. The method of claim 3, wherein the predicting of the position of the vehicle includes:
- calculating a distance to a first obstacle, which is present in the vicinity of the vehicle, using a second environmental sensor mounted to the vehicle;
- acquiring at least one obstacle template corresponding to the distance based on at least one particle, which is present at the predicted position of the vehicle, and the precision map;
- acquiring a second obstacle which matches with the first obstacle among the obstacle templates; and
- assigning a relatively high weight to a particle related to the second obstacle.

8. The method of claim 7, wherein the obstacle template includes a portion of a shape of the first obstacle exposed to a sensing direction of the environmental sensor.

9. A method for performing automated valet parking, comprising:
- initializing, by an infrastructure, automated valet parking of a vehicle;
- transmitting, by the infrastructure, a map of a parking lot to the vehicle;
- transmitting, by the infrastructure, a target position and a guide route from an infrastructure to the vehicle;
- performing, by the vehicle, automated parking along the guide route; and
- providing, by the vehicle, measured position of the vehicle to the infrastructure by measuring a position of the vehicle based on a map and environmental information, while the vehicle performs automated driving,
- wherein the environmental information includes at least one of road signs, walls, and pillars; and
- wherein the environmental information is obtained based on at least one of a lidar and radar,
- wherein the measuring of the position of the vehicle comprises:
  - setting, by the vehicle, an initial position of the vehicle based on the GNSS (Global Navigation Satellite System);
  - estimating, by the vehicle, the position of the vehicle based on the initial position of the vehicle and behavior information of the vehicle; and
  - correction, by the vehicle, the estimated position of the vehicle based on a template having the highest similarity to the environmental information among templates of objects included in the map.

10. The method of claim 9, wherein the behavior information of the vehicle includes at least one among acceleration information, angular velocity information, and shift information of the vehicle.

11. The method of claim 10, wherein the estimating of the position of the vehicle to the infrastructure includes predicting the position of the vehicle based on the behavior information of the vehicle and a particle filter; and
- wherein correcting of the estimated position of the vehicle includes:
  - calculating a weight of a particle based on at least one environmental sensor mounted to the vehicle; and
  - correcting the predicted position of the vehicle based on the weight of the particle.

12. The method of claim 11, wherein the predicting of the position of the vehicle includes:
- acquiring a first parking slot from an image which is acquired through a first environmental sensor mounted to the vehicle;
- acquiring at least one parking slot template corresponding to the first parking slot based on at least one particle, which is present at the predicted position of the vehicle, and a precision map;
- acquiring a second parking slot which matches with the first parking slot among the parking slot templates; and
- assigning a relatively high weight to a particle related to the second parking slot.

13. The method of claim 12, wherein the acquiring of the second parking slot which matches with the first parking slot among the parking slot templates includes calculating the similarity between the first parking slot and the parking slot templates, based on a top-hat filter.

14. The method of claim 12, wherein the first environmental sensor includes a surround view monitor (SVM) camera.

15. The method of claim 11, wherein the predicting of the position of the vehicle includes:
- calculating a distance to a first obstacle, which is present in the vicinity of the vehicle, through a second environmental sensor mounted to the vehicle;
- acquiring at least one obstacle template corresponding to the distance based on at least one particle, which is present at the predicted position of the vehicle, and a precision map;
- acquiring a second obstacle which matches with the first obstacle among the obstacle templates; and
- assigning a relatively high weight to a particle related to the second obstacle.

16. The method of claim 15, wherein the obstacle template includes a portion of a shape of the first obstacle exposed to a sensing direction of the environmental sensor.

* * * * *